US008336099B2

(12) United States Patent
Dow et al.

(10) Patent No.: US 8,336,099 B2
(45) Date of Patent: *Dec. 18, 2012

(54) METHODS, HARDWARE PRODUCTS, AND COMPUTER PROGRAM PRODUCTS FOR IMPLEMENTING INTROSPECTION DATA COMPARISON UTILIZING HYPERVISOR GUEST INTROSPECTION DATA

(75) Inventors: Eli M. Dow, Poughkeepsie, NY (US); Marie R. Laser, Poughkeepsie, NY (US); Charulatha Dhuvur, Poughkeepsie, NY (US); Jessie Yu, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1252 days.

This patent is subject to a terminal disclaimer.

(21) Appl. No.: 12/116,994

(22) Filed: May 8, 2008

(65) Prior Publication Data
US 2009/0282481 A1 Nov. 12, 2009

(51) Int. Cl.
*G06F 21/00* (2006.01)
(52) U.S. Cl. ............... 726/23; 726/1; 726/22; 726/24; 726/25; 713/187; 713/188; 711/6; 711/203; 718/104
(58) Field of Classification Search ............. 726/22–25; 713/187–188; 711/6, 203
See application file for complete search history.

(56) References Cited

U.S. PATENT DOCUMENTS

| | | | |
|---|---|---|---|
| 6,026,462 A | 2/2000 | George et al. | |
| 6,735,666 B1 | 5/2004 | Koning | |
| 7,089,377 B1 * | 8/2006 | Chen | 711/147 |
| 7,159,210 B2 * | 1/2007 | Griffin et al. | 717/141 |
| 7,257,811 B2 | 8/2007 | Hunt et al. | |
| 7,340,777 B1 | 3/2008 | Szor | |
| 7,577,686 B1 * | 8/2009 | Larkin et al. | 1/1 |
| 7,814,287 B2 | 10/2010 | Pratt | |
| 2004/0128670 A1 | 7/2004 | Robinson et al. | |
| 2005/0086523 A1 * | 4/2005 | Zimmer et al. | 713/201 |
| 2005/0160151 A1 * | 7/2005 | Rawson, III | 709/213 |
| 2006/0005189 A1 | 1/2006 | Vega et al. | |
| 2006/0070065 A1 | 3/2006 | Zimmer et al. | |
| 2006/0294519 A1 | 12/2006 | Hattori et al. | |
| 2007/0006218 A1 | 1/2007 | Vinberg et al. | |

(Continued)

OTHER PUBLICATIONS

Lionel Litty, Hypervisor-based Intrusion Detection, copyright 2005, Graduate department of Computer science University of Toronto.*

(Continued)

*Primary Examiner* — Taghi Arani
*Assistant Examiner* — Josnel Jeudy
(74) *Attorney, Agent, or Firm* — Cantor Colburn LLP; Steven Chiu

(57) ABSTRACT

Introspection data comparison is implemented utilizing hypervisor guest introspection data. A hypervisor shim on a hypervisor is used to construct one or more workload management components that are independent from a participating pool member of a pool comprising a guest having a guest memory and a guest operating system. The hypervisor collects a first set of data. The guest sends a second set of data comprising guest memory data from the guest memory. The first set of data is compared with the second set of data to detect at least one of a potential security intrusion or an anomalous deviation between the first set of data and the second set of data. A policy manager takes action based upon a result of the comparison of the first and second sets of data.

15 Claims, 4 Drawing Sheets

U.S. PATENT DOCUMENTS

| | | |
|---|---|---|
| 2007/0050764 A1 | 3/2007 | Traut |
| 2007/0061441 A1 | 3/2007 | Landis et al. |
| 2007/0061492 A1 | 3/2007 | van Riel |
| 2007/0079307 A1 | 4/2007 | Dhawan et al. |
| 2007/0130366 A1 | 6/2007 | O'Connell et al. |
| 2007/0244972 A1 | 10/2007 | Fan |
| 2007/0266383 A1 | 11/2007 | White |
| 2007/0271559 A1 | 11/2007 | Easton et al. |
| 2008/0005297 A1 | 1/2008 | Kjos et al. |
| 2008/0028124 A1 | 1/2008 | Tago |
| 2008/0235793 A1 | 9/2008 | Schunter et al. |
| 2008/0263658 A1 | 10/2008 | Michael et al. |
| 2009/0063749 A1 | 3/2009 | Dow |
| 2009/0204964 A1 | 8/2009 | Foley et al. |
| 2009/0241109 A1 | 9/2009 | Vandegrift et al. |
| 2009/0300605 A1 | 12/2009 | Edwards et al. |
| 2010/0017800 A1 | 1/2010 | Dow et al. |
| 2011/0131388 A1* | 6/2011 | Chen et al. .............. 711/206 |

OTHER PUBLICATIONS

Kurniadi Asrigo et. al., Using VMM-based Sensors to Monitor Honeypots, Jun. 14-16, 2006, ACM.*

U.S. Appl. No. 12/110,593, filed Apr. 28, 2008; Non-Final Office Action mail date Feb. 16, 2012; 17pages.

"Cloud Computing: Benefits and Risks of Moving Federal IT into the Cloud", Testimony of Cita M. Furlani, Director, Information Technology Laboratory, National Institute of Standards and Technology, United States Department of Commerce, United States House of Representatives Committee on Oversight and Government Reform, Jul. 1, 2010.

IBM Redbooks; "IBM Information Infrastructure Solutions Handbook"; IP.COM; Jun. 2010.

L. Van Doorn, "Hardware Virtualization"; ETISS Lecture; Oct. 2007; pp. 1-55.

* cited by examiner

METHODS, HARDWARE PRODUCTS, AND COMPUTER PROGRAM PRODUCTS FOR IMPLEMENTING INTROSPECTION DATA COMPARISON UTILIZING HYPERVISOR GUEST INTROSPECTION DATA

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates generally to workload management in a computing environment and, more particularly, to methods, devices, and computer program products for implementing introspection data comparison utilizing hypervisor guest introspection data.

2. Description of Background

Many modern computing environments include load balancers or workload managers that monitor the resource consumption of a plurality of machines in a management pool. These resources include memory and storage devices that are accessed by one or more of the machines. In most cases, instrumentation is placed on one or more participating machines that are to be managed. If a participating machine is compromised, there exist potential attack vectors for all machines participating in the management pool. Moreover, a participating machine may report erroneous information indicating that the participating machine requires extensive resources whereas, in fact, the resource needs of the participating machine are relatively modest. Accordingly, what is needed is a technique for monitoring memory or storage utilization that does not rely upon information reported by a participating machine. A solution that addresses, at least in part, the above and other shortcomings is desired.

SUMMARY OF THE INVENTION

Embodiments of the invention include methods for implementing introspection data comparison utilizing hypervisor guest introspection data. A hypervisor shim on a hypervisor is used to construct one or more workload management components that are independent from a participating pool member of a pool comprising a guest having a guest memory and a guest operating system. The hypervisor collects a first set of data. The guest sends a second set of data comprising guest memory data from the guest memory. The first set of data is compared with the second set of data to detect at least one of a potential security intrusion or an anomalous deviation between the first set of data and the second set of data. A policy manager takes action based upon a result of the comparison of the first and second sets of data.

Hardware products and computer program products corresponding to the above-summarized methods are also described and claimed herein. Other methods, hardware products, and computer program products according to embodiments will be or become apparent to one with skill in the art upon review of the following drawings and detailed description. It is intended that all such additional methods, hardware products, and computer program products be included within this description, be within the scope of the present invention, and be protected by the accompanying claims.

BRIEF DESCRIPTION OF THE DRAWINGS

Referring now to the drawings, wherein like elements are numbered alike in the several FIGURES.

The detailed description explains the preferred embodiments of the invention, together with advantages and features, by way of example with reference to the drawings.

DETAILED DESCRIPTION OF THE INVENTION

In the following description, details are set forth to provide an understanding of the invention. In some instances, certain software, circuits, structures and methods have not been described or shown in detail in order not to obscure the invention. The term "data processing system" is used herein to refer to any machine for processing data, including the client/server computer systems and network arrangements described herein. The present invention may be implemented in any computer programming language provided that the operating system of the data processing system provides the facilities that may support the requirements of the present invention. The invention may be implemented with software, firmware, or hardware, or any of various combinations thereof.

Figure 1:
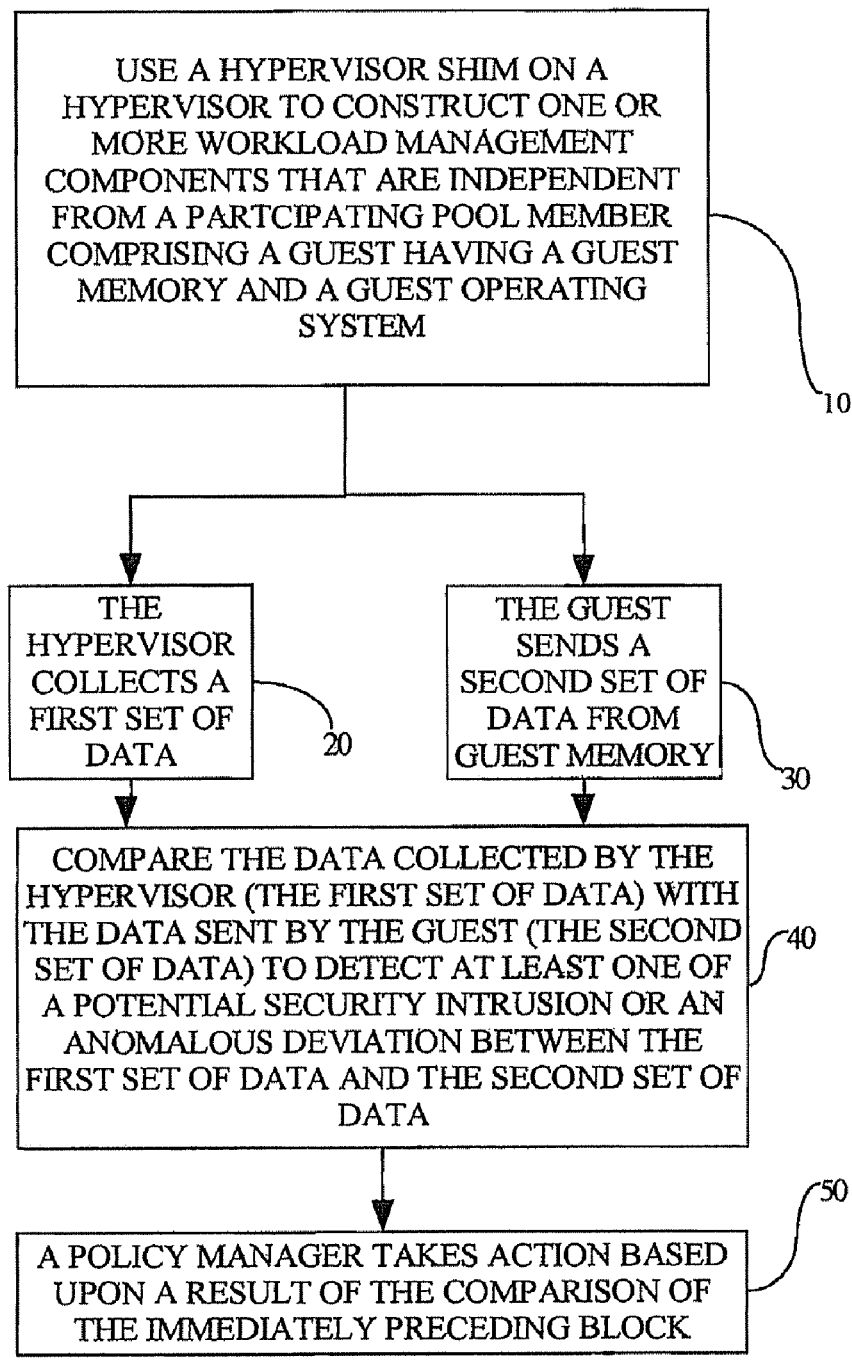
FIG. 1 is a flowchart setting forth a first exemplary method for implementing introspection data comparison utilizing hypervisor guest introspection data.

FIG. 1 is a flowchart setting forth a first exemplary method for implementing introspection data comparison utilizing hypervisor guest introspection data. The operational sequence commences at block 10 where a hypervisor shim on a hypervisor is used to construct one or more workload management components that are independent from a participating pool member of a pool comprising a guest having a guest memory and a guest operating system. Illustratively, the pool may contain a plurality of participating pool members comprising a plurality of respective guests each having a corresponding guest memory.

Blocks 20 and 30 may be performed simultaneously, contemporaneously, or in any order. At block 20, the hypervisor collects a first set of data. At block 30, the guest sends a second set of data from guest memory. Next, at block 40, the data collected by the hypervisor (i.e., the first set of data) is compared with the data sent by the guest (i.e., the second set of data). The first set of data is compared with the second set of data to detect at least one of a potential security intrusion or an anomalous deviation between the first set of data and the second set of data. At block 50, a policy manager takes action based upon a result of the comparison that was performed in block 40.

Figure 2:
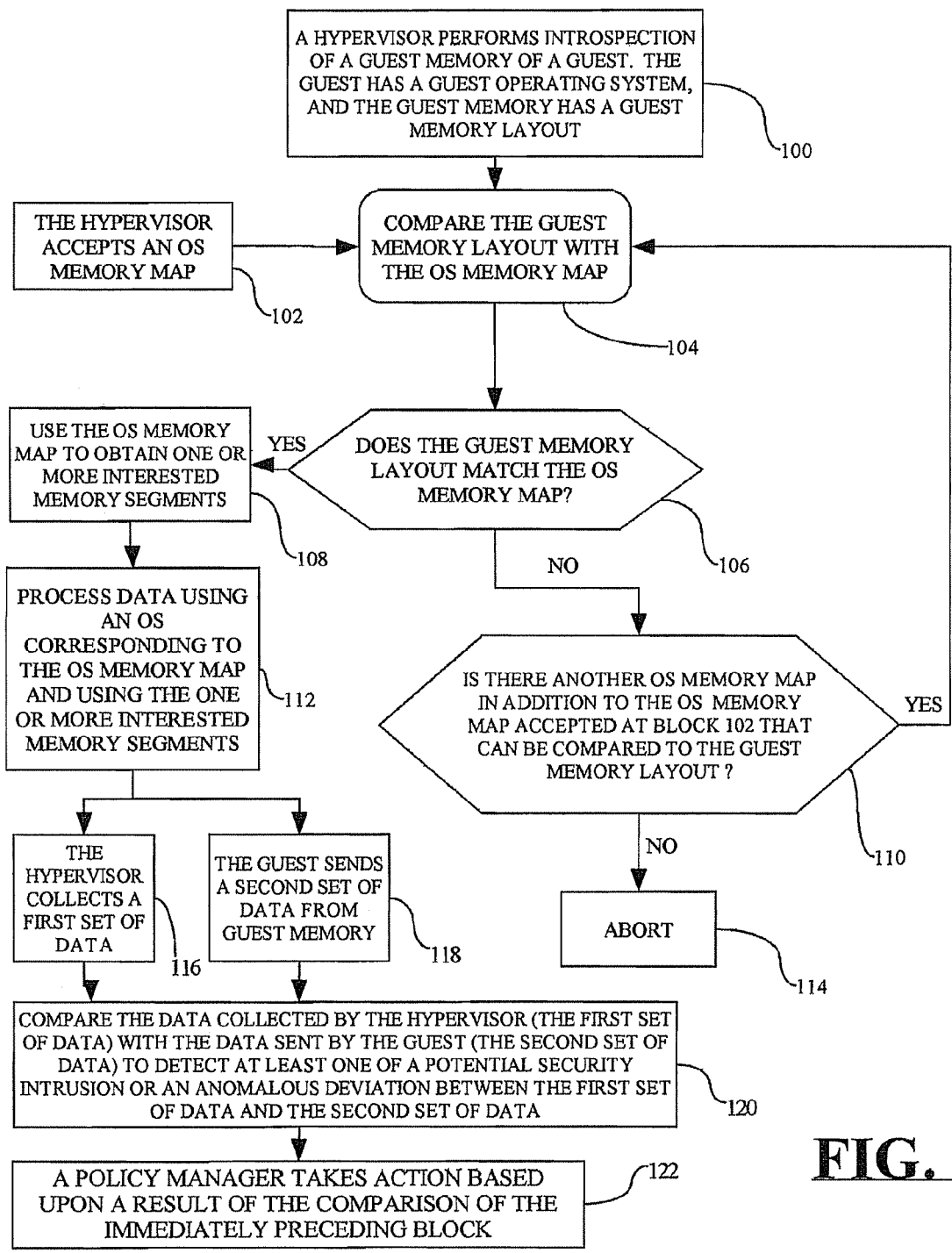
FIG. 2 is a flowchart setting forth a second exemplary method for implementing introspection data comparison utilizing hypervisor guest introspection data.

FIG. 2 is a flowchart setting forth a second exemplary method for implementing introspection data comparison utilizing hypervisor guest introspection data. The operational sequence commences at block 100 or at block 102. Note that blocks 100 and 102 may be performed simultaneously, contemporaneously, or in any order. At block 100, introspection of a guest memory having a guest memory layout is performed. At block 102, an operating system (OS) memory map is accepted. Next, at block 104, the guest memory layout is compared with the OS memory map. A test is performed at block 106 to ascertain whether or not the guest memory layout matches the OS memory map. When the guest memory layout matches the OS memory map, the OS memory map is used to obtain one or more interested memory segments (block 108).

Conceptually, the performance of blocks 100-108 describe implementation of a hypervisor shim on a hypervisor. The hypervisor shim is used to construct one or more workload management components that are independent from a participating pool member of a pool comprising a guest having a guest memory. Illustratively, the pool may contain a plurality of participating pool members comprising a plurality of respective guests each having a corresponding guest memory.

The operational sequence advances from block 108 to block 112 where data processing is performed using an OS corresponding to the OS memory map and using the one or more interested memory segments. Next, the operational sequence progresses from block 112 to any of blocks 116 or 118. Blocks 116 and 118 may be performed simultaneously, contemporaneously, or in any order. At block 116, the hypervisor collects a first set of data. At block 118, a guest sends a second set of data from guest memory. Next, at block 120, the data collected by the hypervisor (i.e., the first set of data) is compared with the data sent by the guest (i.e., the second set of data). The first set of data is compared with the second set of data to detect at least one of a potential security intrusion or an anomalous deviation between the first set of data and the second set of data. At block 122, a policy manager takes action based upon a result of the comparison that was performed in block 120.

If the test performed at block 106 indicates that the guest memory layout does not match the OS memory map accepted at block 102, a test is performed at block 110 to ascertain whether or not there is another OS memory map in addition to the OS memory map of block 102 that has been previously accepted, and that can be compared to the guest memory layout. The affirmative branch from block 110 leads back to block 104, whereas the negative branch from block 110 leads to block 114 where the procedure is aborted.

The procedure of FIG. 2 is performed by constructing one or more workload management components for each of a plurality of guest operating systems, such as a first guest operating system 211 (FIG. 3), a second guest operating system 212, and a third guest operating system 213, using a hypervisor 201 shim that requires no instrumentation on a participating pool member comprising any of the first, second, and third guest operating systems 211, 212, 213, respectively. The construction of one or more workload management components is performed as outlined previously in connection with blocks 100-108 of FIG. 2. In this manner, the workload management components are constructed to implement a zero trust policy.

With reference to FIG. 2, a hypervisor shim is leveraged underneath one or more participating OS's to be resource managed/monitored. At blocks 100-104, the hypervisor shim is used in conjunction with memory layout fingerprinting to examine a guest memory to identify an installed OS. Once the OS acting as a guest (which is to be monitored/managed) has been identified, a policy is then identified that specifies how to manually inspect one or more memory segments, such as memory pages, of that OS for statistical observation. For instance, we can determine if an OS is really using all the memory it claims to need, or if it is essentially being greedy by demanding more memory resources than it will be able to utilize. Optionally, components in addition to or in lieu of the workload management components may be constructed to implement the zero trust policy.

Figure 3:
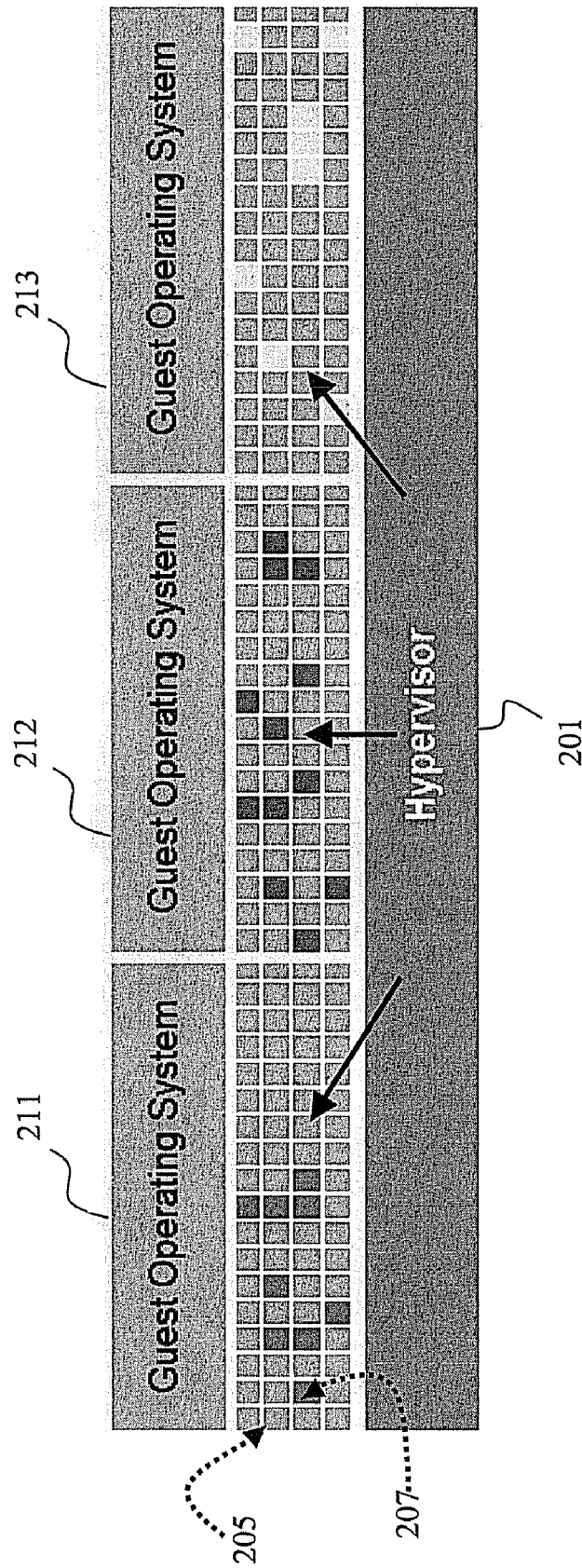
FIG. 3 is an architectural block diagram setting forth an illustrative operational environment in which any of the methods of FIG. 1 or 2 may be performed.

FIG. 3 is an architectural block diagram setting forth an illustrative operational environment in which any of the methods of FIG. 1 may be performed. A hypervisor 201 is operatively coupled to a first guest operating system 211, a second guest operating system 212, and a third guest operating system 213. The hypervisor 201, which may also be referred to as a virtualization manager, is a program that allows multiple OS's, which can include different OS's or multiple instances of the same OS, to share a single hardware processor. The first, second, and third guest operating systems 211, 212, 213, respectively, each have a guest memory layout and at least one interested guest memory page. For example, the first guest operating system 211 has a guest memory layout 205 and an interested guest memory page 207.

Illustratively, the hypervisor 201 is designed for a particular processor architecture, such as PowerPC architecture or Intel's x86 processor. Each OS, including the first guest operating system 211, the second guest operating system 212, and the third guest operating system 213, appears to have processor, memory, and other storage resources all to itself. However, the hypervisor 201 actually controls a processor and its resources, allocating what is needed to each operating system in turn, such as the first, second, or third guest operating system 211, 212, or 213, respectively.

Because an OS is often used to run a particular application or set of applications in a dedicated hardware server, use of the hypervisor 201 makes it possible to run multiple OS's (and their applications) in a single server, reducing overall hardware costs. Thus, a plurality of production and test systems can run at the same time in the same hardware. In addition, with the hypervisor 201, different operating systems such as Windows and Linux can share the same server.

Figure 4:
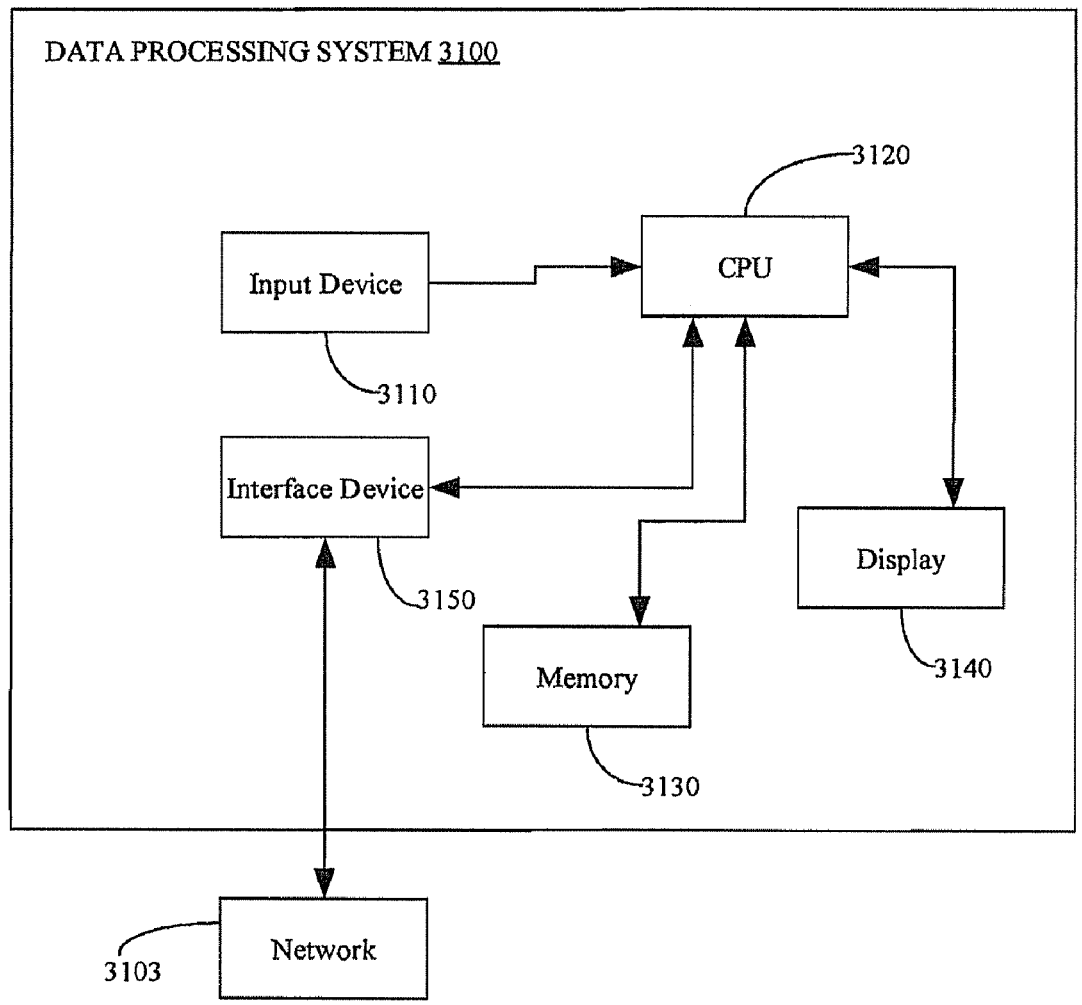
FIG. 4 is a block diagram setting forth an exemplary computer program product or hardware product for implementing introspection data comparison utilizing hypervisor guest introspection data.

FIG. 4 is a block diagram setting forth an exemplary computer program product or hardware product for implementing a zero-trust policy in storage reports. It is to be clearly understood that FIG. 4 is illustrative in nature, as other systems, devices, or apparatuses not shown in FIG. 4 may also be used to implement embodiments of the invention. A data processing system 3100 includes an input device 3110, a central processing unit ("CPU") 3120, memory 3130, a display 3140, and an interface device 3150. The input device 3110 may include a keyboard, a mouse, a trackball, or a similar device. The CPU 3120 may include dedicated coprocessors and memory devices. The memory 3130 may include RAM, ROM, databases, or disk devices. The display 3140 may include a computer screen, terminal device, a hardcopy producing output device such as a printer or plotter, or a similar device. The interface device 3150 may include a connection or interface to a network 3103 such as the Internet, an intranet, a local area network (LAN), or a wide area network (WAN). Optionally, the data processing system 3100 may be linked to other data processing systems over the network 3103. These other data processing systems may, but need not, include an application for implementing a zero-trust policy in storage reports as described in conjunction with any of FIGS. 1 and 2. Of course, the data processing system 3100 may contain additional software and hardware, a description of which is not necessary for understanding the invention.

The data processing system 3100 has stored therein data representing sequences of instructions which, when executed, cause the methods described in connection with any of FIG. 1 or 2 to be performed. Thus, the data processing system 3100 includes computer executable programmed instructions for directing the system 3100 to implement any of the embodiments of the present invention. The programmed instructions may be embodied in at least one hardware, firmware, or software module 3170 resident in the memory 3130 of the data processing system 3100. Alternatively or additionally, the programmed instructions may be embodied on a computer readable medium (such as a CD disk, floppy disk, or USB-readable semiconductor storage device) which may be used for transporting the programmed instructions to the memory 3130 of the data processing system 3100. Alternatively or additionally, the programmed instructions may be embedded in a computer-readable, signal or signal-bearing medium that is uploaded to the network 3103 by a vendor or supplier of the programmed instructions, and this signal or signal-bearing medium may be downloaded through an interface 3150 to the data processing system 3100 from the network 3103 by end users or potential buyers.

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for implementing introspection data comparison utilizing hypervisor guest introspection data, the method comprising:
constructing one or more workload management components for a plurality of guest operating systems using a hypervisor shim that requires no instrumentation on a participating pool member of a pool comprising the plurality of guest operating systems, wherein the pool is associated with the hypervisor shim, wherein the participating pool member comprises a guest having a guest memory, a guest memory layout and a guest operating system, and wherein the one or more workload management components are constructed by:
performing introspection of the guest memory,
accepting an operating system (OS) memory map, and
comparing the guest memory layout with the OS memory map wherein, when the guest memory layout matches the OS memory map;
the hypervisor shim collecting a first set of data using the OS memory map that matches the guest memory layout to obtain one or more interested memory segments from the guest memory layout, wherein the one or more interested memory segments correspond to resource utilization by the guest, wherein the first set of data is obtained without information reported by the guest;
the guest sending a second set of data comprising guest memory data corresponding to resource utilization from the guest memory;
comparing the first set of data with the second set of data to detect at least one of a potential security intrusion or an anomalous deviation between the first set of data and the second set of data; and
a policy manager taking action based upon a result of the comparison of the first and second sets of data.

2. The method of claim 1 wherein constructing one or more workload management components further comprises:
using an OS corresponding to the OS memory map and using the one or more interested memory segments to perform data processing.

3. The method of claim 1 wherein the hypervisor shim is leveraged underneath one or more participating OS's to be resource managed/monitored.

4. The method of claim 3 wherein the hypervisor shim is used in conjunction with memory layout fingerprinting to examine the guest memory layout to identify an installed OS.

5. The method of claim 4 wherein, once the installed OS has been identified, a policy is then identified that specifies how to manually inspect one or more memory segments comprising one or more memory pages of the installed OS for statistical observation.

6. A computer program product for implementing introspection data comparison utilizing hypervisor guest introspection data, the computer program product including a non-transitory storage medium readable by a processing circuit and storing instructions for execution by the processing circuit for facilitating a method including:
constructing one or more workload management components for a plurality of guest operating systems using a hypervisor shim that requires no instrumentation on a participating pool member of a pool comprising the plurality of guest operating systems, wherein the pool is associated with the hypervisor shim, wherein the participating pool member comprises a guest having a guest memory, a guest memory layout and a guest operating system, and wherein the one or more workload management components are constructed by:
performing introspection of the guest memory,
accepting an operating system (OS) memory map, and
comparing the guest memory layout with the OS memory map wherein, when the guest memory layout matches the OS memory map;
the hypervisor shim collecting a first set of data using the OS memory map that matches the guest memory layout to obtain one or more interested memory segments from the guest memory layout, wherein the one or more interested memory segments correspond to resource utilization by the guest, wherein the first set of data is obtained without information reported by the guest;
the guest sending a second set of data comprising guest memory data corresponding to resource utilization from the guest memory;
comparing the first set of data with the second set of data to detect at least one of a potential security intrusion or an anomalous deviation between the first set of data and the second set of data; and a policy manager taking action based upon a result of the comparison of the first and second sets of data.

7. The computer program product of claim 6 wherein constructing one or more workload management components further comprises:
using an OS corresponding to the OS memory map and using the one or more interested memory segments to perform data processing.

8. The computer program product of claim 7 wherein the hypervisor shim is leveraged underneath one or more participating OS's to be resource managed/monitored.

9. The computer program product of claim 8 wherein the hypervisor shim is used in conjunction with memory layout fingerprinting to examine the guest memory layout to identify an installed OS.

10. The computer program product of claim 9 wherein, once the installed OS has been identified, a policy is then identified that specifies how to manually inspect one or more memory segments comprising one or more memory pages of the installed OS for statistical observation.

11. A hardware product for implementing introspection data comparison utilizing hypervisor guest introspection data, the hardware product including a non-transitory storage medium readable by a processing circuit and storing instructions for execution by the processing circuit for facilitating a method including:
constructing one or more workload management components for a plurality of guest operating systems using a hypervisor shim that requires no instrumentation on a participating pool member of a pool comprising the plurality of guest operating systems, wherein the pool is associated with the hypervisor shim, wherein the participating pool member comprises a guest having a guest memory, a guest memory layout and a guest operating system, and wherein the one or more workload management components are constructed by:
performing introspection of the guest memory,
accepting an operating system (OS) memory map, and
comparing the guest memory layout with the OS memory map wherein, when the guest memory layout matches the OS memory map;
the hypervisor shim collecting a first set of data using the OS memory map that matches the guest memory layout to obtain one or more interested memory segments from the guest memory layout, wherein the one or more interested memory segments correspond to resource utilization by the guest, wherein the first set of data is obtained without information reported by the guest;
the guest sending a second set of data comprising guest memory data corresponding to resource utilization from the guest memory;
comparing the first set of data with the second set of data to detect at least one of a potential security intrusion or an anomalous deviation between the first set of data and the second set of data; and
a policy manager taking action based upon a result of the comparison of the first and second sets of data.

12. The hardware product of claim 11 wherein constructing one or more workload management components further comprises:
using an OS corresponding to the OS memory map and using the one or more interested memory segments to perform data processing.

13. The hardware product of claim 12 wherein the hypervisor shim is leveraged underneath one or more participating OS's to be resource managed/monitored.

14. The hardware product of claim 13 wherein the hypervisor shim is used in conjunction with memory layout fingerprinting to examine the guest memory layout to identify an installed OS.

15. The hardware product of claim 14 wherein, once the installed OS has been identified, a policy is then identified that specifies how to manually inspect one or more memory segments comprising one or more memory pages of the installed OS for statistical observation.

* * * * *